(12) United States Patent
Fahldieck et al.

(10) Patent No.: US 10,899,554 B2
(45) Date of Patent: Jan. 26, 2021

(54) DEVICE AND METHOD FOR TRANSPORTING CONTAINERS

(71) Applicant: KHS GmbH, Dortmund (DE)

(72) Inventors: Andreas Fahldieck, Idar-Oberstein (DE); Wilfried Ehmer, Dortmund (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 16/614,894

(22) PCT Filed: Mar. 27, 2018

(86) PCT No.: PCT/EP2018/057703
§ 371 (c)(1),
(2) Date: Nov. 19, 2019

(87) PCT Pub. No.: WO2018/219523
PCT Pub. Date: Dec. 6, 2018

(65) Prior Publication Data
US 2020/0207551 A1 Jul. 2, 2020

(30) Foreign Application Priority Data
Jun. 2, 2017 (DE) .......................... 10 2017 112 220

(51) Int. Cl.
*B65G 47/52* (2006.01)
*B65G 47/86* (2006.01)
*B65G 47/84* (2006.01)

(52) U.S. Cl.
CPC ............ *B65G 47/52* (2013.01); *B65G 47/84* (2013.01); *B65G 47/847* (2013.01); *B65G 2201/0244* (2013.01)

(58) Field of Classification Search
CPC ...... B65G 47/847; B65G 47/84; B65G 47/52; B65G 2201/0244
(Continued)

(56) References Cited

U.S. PATENT DOCUMENTS 7,543,697 B2 * 6/2009 Legallais ............. B65G 47/847
198/470.1
7,581,635 B2 * 9/2009 Lecomte ................ B65G 33/02
198/459.4
(Continued)

FOREIGN PATENT DOCUMENTS

DE 1482616 1/1969
DE 102008052768.8 10/2008
(Continued)

OTHER PUBLICATIONS

Klothoide. Wikipedia,Nov. 2017.
(Continued)

*Primary Examiner* — James R Bidwell
(74) *Attorney, Agent, or Firm* — Occhiuti & Rohlicek LLP

(57) ABSTRACT

An apparatus for transporting containers along a transport route includes first and second transport elements, at least one of which comprises grippers that are radially movable in relation to a vertical machine axis about which said first transport element rotates. The said first and second transport elements define a transport route that comprises first and second transport-route sections defined by circular arcs and a third transport-route section disposed between them. The third transport-route section comprises a transport-route region that defines a course having a kink-free transition-curve section having a curvature that either only increases or only decreases.

20 Claims, 7 Drawing Sheets

(58) Field of Classification Search
USPC .......................................... 198/470.1, 474.1
See application file for complete search history.

(56) References Cited

U.S. PATENT DOCUMENTS

| | | | | |
|---|---|---|---|---|
| 8,033,381 | B2* | 10/2011 | Konstandin | B65H 29/241 |
| | | | | 198/458 |
| 8,651,853 | B2* | 2/2014 | Dupuis | B65G 47/847 |
| | | | | 425/524 |
| 2003/0010603 | A1* | 1/2003 | Corrigan | B65G 47/846 |
| | | | | 198/474.1 |
| 2003/0132083 | A1* | 7/2003 | Tale | B65B 11/28 |
| | | | | 198/470.1 |
| 2004/0124068 | A1* | 7/2004 | Berndtsson | G06K 13/08 |
| | | | | 198/608 |
| 2014/0251766 | A1 | 9/2014 | Fahldieck | |
| 2016/0114988 | A1* | 4/2016 | Unterseher | B65G 54/02 |
| | | | | 198/465.1 |
| 2017/0152114 | A1 | 6/2017 | Kurosawa | |

FOREIGN PATENT DOCUMENTS

| | | |
|---|---|---|
| DE | 102011115512 | 4/2013 |
| DE | 102017112220.6 | 6/2017 |
| EP | 2179960 | 1/2016 |
| EP | 3199490 | 8/2017 |
| JP | H09142649 | 6/1997 |

OTHER PUBLICATIONS

Blossbogen. Wikipedia. Oct. 25, 2016.
Espacenet English translation of claims and description of DE Patent 1482616.

* cited by examiner

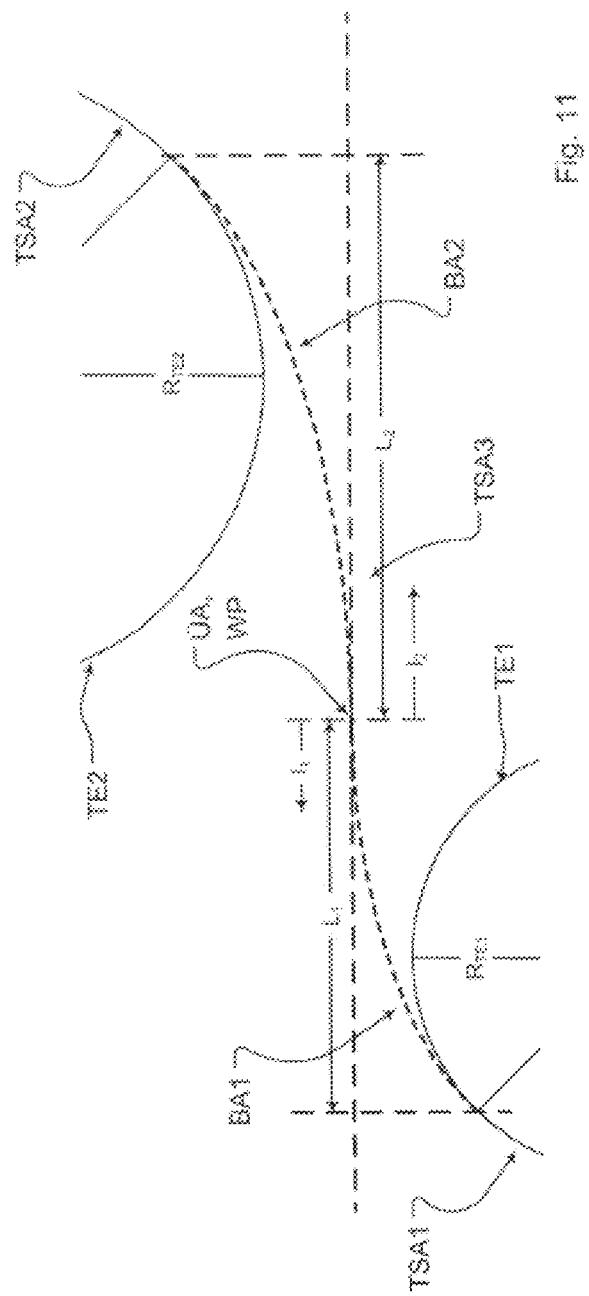

DEVICE AND METHOD FOR TRANSPORTING CONTAINERS

RELATED APPLICATIONS

This application is the national stage under 35 USC 371 of international application PCT/EP2018/057703, filed on Mar. 27, 2018, which claims the benefit of the Jun. 2, 2017 priority date of German application DE 10 2017 112 220.6, the contents of which are incorporated by reference.

FIELD OF INVENTION

The invention relates to a device and method for transporting containers in a transition region between rotating transport elements.

BACKGROUND

A typical container-transport device includes transport elements that rotate about corresponding vertical machine axes. These transport elements connect to each other to define a transport route. A container proceeds along the route by being conveyed from one transport element to the next.

Among these devices are those in which the transport elements also function as container-treatment devices. Examples include those in which one transport element is a filling machine and another is a transport star that couples between the filling machine and a closing machine to convey filled but open containers to the closing machine.

The transport path formed in this manner is a curved path with multiple deflections. As a result, the container experiences a transverse jerk. When containers move fast, this can be enough to cause filling material to slop out of the container.

SUMMARY

An object of the invention is that of providing a device and method for transporting containers along a transport route in a way that reduces an extent to which a container experiences transverse jerk.

In one aspect, the invention features an apparatus that transports containers along a transport route. The apparatus includes first and second transport elements. However, preferred embodiments also include a third transport element.

The transport route comprises first and second transport-route sections with a third transport-route section between them. The first and second transport-route sections are shaped like circular arcs. The third transport-route section follows a transition curve having a smooth curvature that is either constantly increasing or constantly decreasing.

In a preferred embodiment, the curvature changes linearly with no kink or point-of-inflection along its course. As a result, a container that is transported along this route experiences minimal jerk. In some embodiments, the transition curve is a section of a clothoid or a bloss curve.

As used herein, "transport route" refers to a corridor that is bounded by envelope curves. A midline defines this corridor. The corridor has a width that is typically between four and ten millimeters inclusive. In a preferred embodiment, the width is between 4 and 7.5 millimeters. A "transport-route section" is a section of this transport route.

An advantage of the foregoing apparatus arises from the ability to avoid abrupt changes in the transverse acceleration of a container as it travels along the transport route. This is useful when transporting a filled but open container. Such transverse accelerations can cause filling contents to slop over the container's still-open mouth.

In some embodiments, the third transport-route section comprises two transition-curve sections. Among these are embodiments in which the two transition-curve sections have different dimensions. These differences can result from differently formed transition-curve sections with different parameters defining the transition-curve sections.

In the foregoing embodiments, first and second transition-curve sections with different radii of curvature form corresponding first and second transition-route sections. The radii of curvature depend on the corresponding radii of the first and second transport elements in such a way as to promote the extent to which the container experiences a jerk-free transition between the transport elements.

In other embodiments, the transition-curve sections connect to one another at a turning point, preferably directly. Among these are those embodiments in which the curvature of the transition-curve sections at the turning point is zero, those in which the radii of curvature of the transition-curve sections is infinite, those in which there is no kink at the turning point, those in which there is no point of inflection at the turning point, and combinations of the foregoing.

Embodiments further include those in which, from the turning point onwards, the curvature radii decrease linearly and the curvature increases such that the transition-curve sections connecting to one another form an almost S-shaped third transport-route section course.

At the ends of the transition-curve sections located remote from the turning point, the transition-curve sections transition, preferably at a constant rate, into the first or second transport-route sections, both of which take the form of circular arcs. Thus, at these transition points, the radius of the first transition-curve section is equal to the radius of the circle on which the containers travel along the first transport-route section. Similarly, the radius of the second transition-curve section at the transition point to the second transport-route section is equal to the radius of the circle on which the containers travel along the second transport-route section.

In some embodiments, the transition-curve sections connect to one another by a transport route region that runs in a straight line. Among these are embodiments in which the resulting straight transport route region is between the two transition-curve sections and is directly delimited by them.

In other embodiments, the third transport-route section has first and second transport-route regions, one of which runs straight and the other of which follows a transition-curve section. This embodiment is particularly useful for cases in which the diameter of one transport element much greater than that of the other, for example when it is at least thrice that of the other. This promotes a transition that is typically free enough of transverse jerk to avoid spillage of liquid contents.

In other embodiments, the transition-curve section is a clothoid section whose clothoid parameter "A," tangent angle "TW," clothoid length "KL," and radius "R" satisfy the following relationships:

$$A = \sqrt{2 \cdot TW \cdot R^2};$$

$$KL = \frac{A^2}{R};$$

In some embodiment, the clothoid parameter "A" is selected to be between 125 millimeters and 250 millimeters.

In other embodiments the clothoid parameter "A" is selected to be between 150 millimeters and 200 millimeters. In yet other embodiments, the clothoid parameter "A" is selected to be between 170 millimeters and 180 millimeters. As a result, with conventional transport element diameters, for example in the range between one meter and five meters, it is possible to achieve a jerk-free transition of the container or a transition that has sufficiently low jerk to spillage of contents out of the container's mouth.

In some embodiments, the tangent angle TW is between 0.06 radians and 0.5 radians. In other embodiments, the tangent angle TW is between 0.1 radians and 0.4 radians. In yet other embodiments, the tangent angle TW is 0.2 radians. As a result, with a spatially delimited stroke of the container gripper and a delimited axial distance interval between the transport elements, it is possible to achieve a jerk-free transition of the container or a transition that has sufficiently low jerk to avoid spillage of contents out of the container's mouth.

In some embodiments, the clothoid length KL is between 50 millimeters and 250 millimeters. Among these are embodiments in which it is between 100 millimeters and 200 millimeters. This leads to a transition of the containers between the transport elements that avoids or significantly reduces transverse jerk without imposing excessive changes to the geometry of the transport route or the transport device.

In some embodiments, the transition-curve section is configured as a bloss curve. In other embodiments, the transition curve is defined by a cubic polynomial that passes tangentially from one curvature into the other.

In other embodiments, the transport curve section, also designated hereinafter as the "transition curve," has a starting and ending point. The curvature k between the transition curve begins with a value of zero and ends with the curvature of the transport path to which it connects. In some embodiments, the transition curve is given by:

$$k = \frac{3}{R \cdot L^2} \cdot l^2 - \frac{2}{R \cdot L^3} \cdot l^3$$

where R is the radius of the connection circular curve, l is the intermediate length of the transition-curve section observed from the starting point, and L is the overall length of the transition curve.

In some of those embodiments in which one transition curve connects to another, whether directly or indirectly, one transition-curve section is mathematically different from each other. In some of these embodiments, a bloss curve connects directly to a bloss curve running in the opposite direction. In other embodiments, a bloss curve connects to a bloss curve running in the opposite direction via a straight guide section. Also among these embodiments are those that combine a bloss curve and a clothoid.

In some embodiments, the first and second transport elements rotate about their respective vertical machine axes. Among these are embodiments in which the first and second transport elements are rotors. Such embodiments are useful for their high delivery capacity, which is measured as the number of containers delivered per unit time.

In some embodiments, the transport element, which is driven about a vertical axis, comprises container-fixing means. Among these are embodiments in which the container-fixing means comprises a container gripper that is displaceable radially either towards or away from the vertical machine-axis. Among these are embodiments in which the gripper transitions between a radially-extended position and a radially-retracted position as well through intermediate positions between its extended and retracted positions. In some of these embodiments, the gripper moves continuously and therefore can be at any intermediate position. As a result, by adjusting the gripper radially while rotating the transport element, it is possible to cause the container to traverse the desired transition-curve section.

In some embodiments, a curve control causes the gripper's radial displacement while the transport element rotates.

In other embodiments, the gripper also pivots either along the circumferential direction or against the circumferential direction. This is achieved by providing flexibility to enable the gripper to pivot passively with or against the transport direction.

In another aspect, the invention features a method for transporting containers on a transport route using first and second transport elements, with the containers being conveyed on a transport route that includes first and a second transport-route sections, each of which is part of a circle. A third transport-route section is disposed between the first and second transport-route sections.

According to the method, a container's movement along the third transport-route section takes place at least section-by-section along a transport-route region, the course of which is defined by a transition-curve section. This transition-curve section is a curve section that is kink-free and that has either a continually increasing curvature or a continuously decreasing curvature.

By the use of a transport-route section having the foregoing forms, it is possible to avoid or reduce abrupt changes in the transverse acceleration. This reduces the slopping of the filling material over the still-open container mouth.

In some embodiments, each transport element has container-fixing elements that hold a container and that move radially towards and away from the machine axis to cause the container to follow the transition curve.

Some embodiments rely on container grippers to move the containers. These container grippers have first and second arms. A radially movable thrust element forces the arms to pivot. The thrust element comprises first and second control curves to control the first and second gripper arms respectively. The first and second control curves guide the corresponding first and second gripper arms between a gripping position and a releasing position.

Each of the gripper arms includes an engagement element that engages its corresponding control curve. Each container gripper also includes a carrier body that includes a slide section. The slide section enables the container gripper to be radially displaceable towards or away from the machine axis and to be accommodated in a corresponding receiver.

In some embodiments, a driver that interacts with a control curve or a corresponding curve roller controls movement of a blocking element associated with a container gripper to cause the container gripper to move between a blocking state and a releasing state.

In other embodiments, when the control curve causes the blocking element to assume a particular position, the blocking element remains at that position without further assistance from the control curve. This means that the corresponding state of the gripper, i.e., whether it is gripping or releasing, remains the same until another control curve changes it. This results in shorter control curves with simpler geometries. This reduces design effort and expense, wear, manufacturing costs, and promotes ease of cleaning the transport device or the container-handling machine.

The container gripper permits simple, rapid, and tool-free exchange of function elements, such as complete modules and parts subject to wear. This promotes the ability to quickly replace worn parts and to adapt the transport element for carrying out different functions using different function elements.

A container gripper as described herein permits the use of small transport elements and to have the grippers be close to each other along the periphery. Examples of such small transport elements are those with a diameter of only 540 millimeters In some embodiments, the spacing between grippers is on the order of 30 PI (30 times PI). This corresponds to container grippers with the part-circular diameter of 540 millimeters referred to heretofore.

Because of the gripper's secure hold on the container, it is possible to securely hold filled containers with that have only small neck rings or shallow securing-ring grooves. This means that it is possible to reduce the dimensions of these structures, for example by making thinner or narrower. This reduces material costs.

Yet another advantage arises from the ease with which the container carrier can be cleaned. This arises from its open structural design and the ease with which its function elements can be assembled and disassembled.

Yet another advantage arises from the short stroke of the thrust element and its low mass. As a result of this short stroke, it is possible to open and close the gripper very quickly.

Yet another advantage arises from the small force that is needed to move the thrust element. This small force means reduced wear and reduced noise.

In some embodiments, all the function elements of the container gripper that interact with the thrust element are located beneath the gripper arms. These would include the thrust element itself, and the gripper arm's control curves. This tends to avoid bacterial contamination of a container being held by the container gripper. This is particularly important because the container may still be open.

In some embodiments, the thrust element comprises a guide section and a control section. In these embodiments, the first and second control curves are allocated to the control section.

In further embodiments, a connection section between the guide section and the control section promotes elastic deflection of the control section relative to the guide section.

In yet other embodiments, the control section, as seen from above the thrust element, is W-shaped or shaped like a crossbow. In these embodiments, each outer limb of the W-shaped control section is associated with a corresponding one of the two control curves.

In an advantageous embodiment, the two control curves are open at the end pointing towards the machine axis, and exhibit an introduction opening, by means of which the engagement elements can be inserted into the respective control curve during the installation. In this situation, the introduction openings can ideally be somewhat tapered, such that a slightly increased expenditure of force is required in order to thrust the thrust element by way of the engagement elements into the respective control curve, wherein this tapering serves as a retainer for the open position of the gripper.

In a further embodiment, the first control curve comprises first and second pivot guide surfaces opposite one another and running parallel to the associated pivot axis of the corresponding first gripper arm. These serve to guide the first engagement element, which is both associated with the first gripper arm and in contact with these surfaces, between the gripping and releasing positions.

In another embodiment, the second control curve comprises first and second guide surfaces that are opposite one another and that run parallel to the associated pivot axis of the second gripper arm. These guide surfaces guide the second engagement element with which they are in contact and thereby guide the second gripper arm between the gripping and releasing position.

In a further embodiment, the first and second control curves are mirror-symmetrical to a mid-plane oriented radially to the machine axis and including the machine axis.

In other embodiments, the first control curve is configured in such a way that its first guide surface initiates closure of the gripper arms into the gripping position and its second guide surface initiates opening of the gripper arms into the release position in response to radial displacement of the thrust element.

In yet other embodiments, an opening of the carrier body accommodates the guide section of the thrust element and guides it during radial displacement along the machine axis.

Still other embodiments include a hollow cylindrical cutout aperture in the carrier body to accommodate the guide section of the thrust element and to guide it during radial displacement towards or away from the machine axis.

In a further embodiment, a hollow cylindrical cutout aperture forms a thrust axis that extends perpendicular to the machine axis. The guide section accommodated in the cutout aperture can be displaced along this thrust axis.

In a further embodiment, an opening of the carrier body forms a guide rail for the guide section. This enables the guide section to be guided within a slot while also being held.

In some embodiments, a curve roller initiates a thrust movement onto the thrust element. The curve roller is provided on the guide section and is freely rotatable about an axis parallel or essentially parallel to the machine axis.

In some embodiments, the curve roller moves radially outward in such a way that the two control curves of the thrust element, through the second guide surface, initiate opening movement onto the two gripper arms, thus initiating a transition into the gripper's releasing position.

In yet other embodiments, a magnetically created resetting force closes the gripper arms as the gripper transitions out of the releasing position and into the closing position or opens the gripper arms during the transition into the release position.

In some of the foregoing embodiments, a magnetic force exerted onto the thrust element moves it along the thrust axis radially inwards towards the machine axis.

Also among the embodiments are those that include magnets arranged in the carrier body and at the guide section and those that include material that exerts an attracting magnetic force. In either case, a magnetic force exists along the thrust axis.

In the gripping position, the magnets are in contact or essentially in contact. In the releasing position, the magnets are separated but remain close enough so that a measurable magnetic interaction between them persists.

Further embodiments include openings on opposite sides of a carrier body's longitudinal extension. These openings accommodate a magnet that magnetically interacts with a magnet associated with the guide section of the thrust element.

According to further embodiments, at the free face sides of an open end of the opening, a magnet or a material exerting an attracting magnetic force is provided in each case on opposing sides of the mid-plane at the carrier body. The magnets or materials exerting an attracting magnetic force are in magnetic interaction with two magnets arranged at a holding section of the thrust element. Some embodiments implement an inverse arrangement of the foregoing.

Some embodiments feature a curve roller that is magnetically held to the thrust element. Among these are embodiments in which a magnet holds the curve roller to the thrust element.

Additional embodiments feature a control roller that is freely rotatable about an axis that is parallel to or essentially parallel to the machine axis. This control roller initiates the carrier' body's thrust movement.

Also among the embodiments are those in which the container gripper is configured to suspend a container by it neck, and in particular, by suspending it from ring or flange that is formed at the container's neck.

As used herein, "clothoid" refers to a curve whose curvature increases linearly such that a product of the curve's radius and its length remains constant. Thus, the curvature at a point on a curve is proportional to path length along the curve that is required to reach that point from the beginning of the curve.

As used herein, the term "container" refers to bottles, cans, beakers, etc., that are made of metal, glass, and/or plastic, preferably from polyethylene terephthalate.

As used herein, terms such as "essentially" or "approximately" signify deviations from an exact value in each case by ±10%, preferably by ±5%, and/or deviations that are of no significance for function.

Further embodiments, advantages, and possible applications of the invention can be derived from the following description of exemplary embodiments and from the figures. The contents of the claims are also constituent parts of the description.

These and other features of the invention will be apparent from the following detailed description and the accompanying figures, in which:

BRIEF DESCRIPTION OF THE DRAWINGS

FIG. 11 shows a transport route in a transition region between first and second transport elements in which the transition region has two bloss curves.

DETAILED DESCRIPTION

Figure 1:
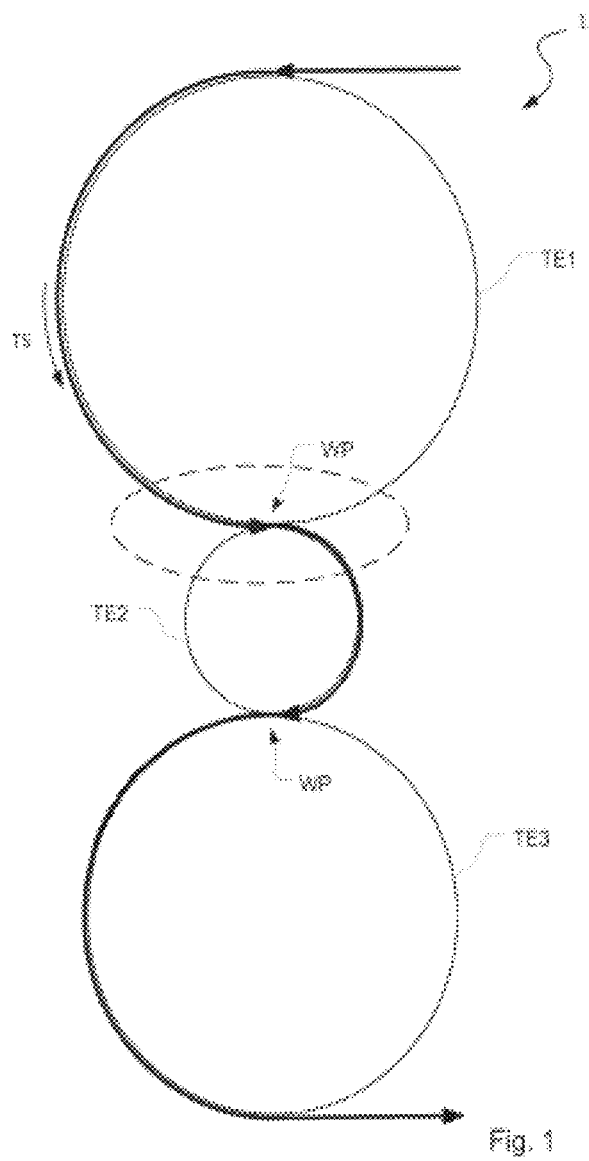
FIG. 1 shows a top view of a transport device having rotating transport elements.

FIG. 1 shows a transport device 1 that conveys a containers along a route TS having multiple deflections. The transport device 1 includes plural transport elements. The illustrated embodiment includes a first transport element TE1, a second transport element TE2 that connects to the first transport element TE1 in the transport direction, and a third transport element TE3 that connects to the second transport element TE2 in the transport direction. Each of the first, second, and third transport elements TE1, TE2, TE3 rotates about a corresponding vertical axis thereof.

Figure 4:
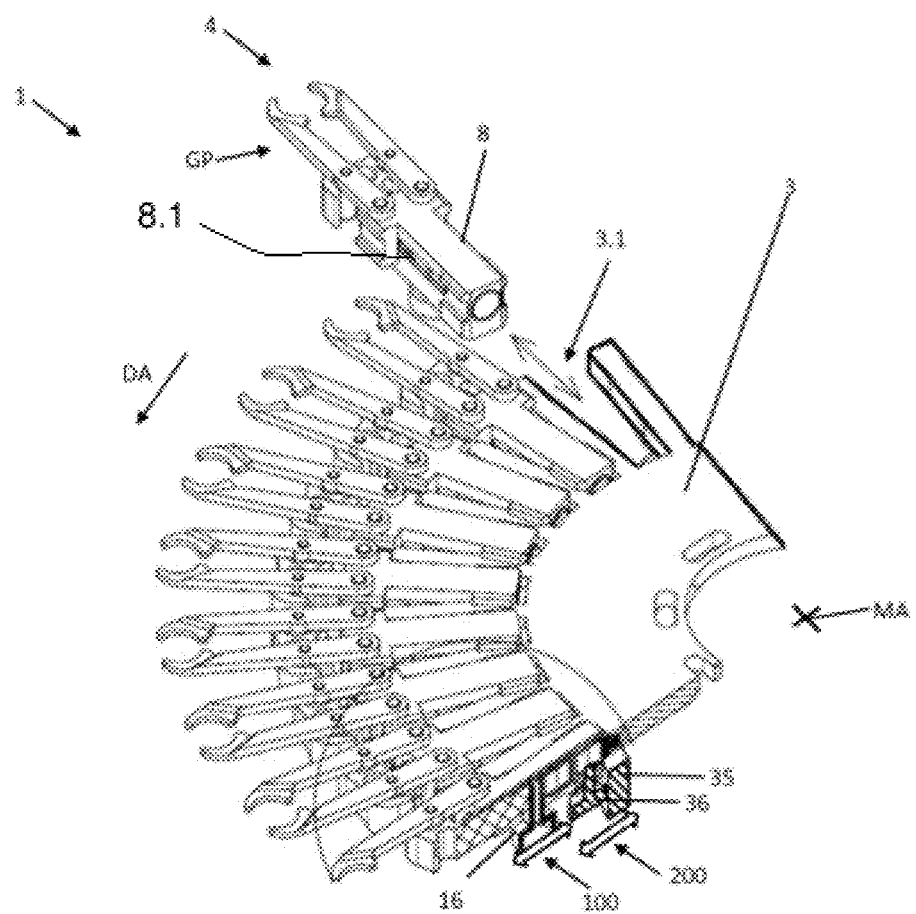
FIG. 4 is a perspective view of container grippers along a portion of a transport element.

As shown in FIG. 4, a transport element TE1-TE3 has a circumference or periphery around which are mounted grippers 4 that hold a container 2 during transport thereof.

In some embodiments, one or more of the transport elements TE1-TE3 is configured for container treatment. Among these are embodiments in which the first transport element TE1 is a filling machine that fills empty containers with filling product and the third transport element TE3 is a closing machine that closes with closure elements, such as screw caps and crown corks. The second transport element TE2 is a transfer star that does not carry out container treatment. Its role is to carry open or filled containers from the first transport element TE1 to the third transport element TE3.

As shown in FIG. 1, the transport route TS has multiple deflections formed by circular or essentially circular arcs that are tangent to each other at turning points WP. The turning point WP marks a point of inflection at which the transport route's curvature changes. In particular, the angular velocity vector of a container 2 changes sign at the turning point WP. This sign change can promote a transverse jerk at the container. In cases where the container is filled but not closed, this transverse jerk can lead to spillage through the container's open mouth.

To reduce or essentially avoid transverse jerk, the transport route TS includes a transition region between two sequential transport elements TE1-TE2, TE2-TE3 along which the container traverses a section of a transition curve, such as a clothoid. The dotted oval shown in FIG. 1 encloses a portion of this transition region between the first and second transport elements TE1-TE2. Details of this transition region are shown in more detail in FIG. 2.

Figure 2:
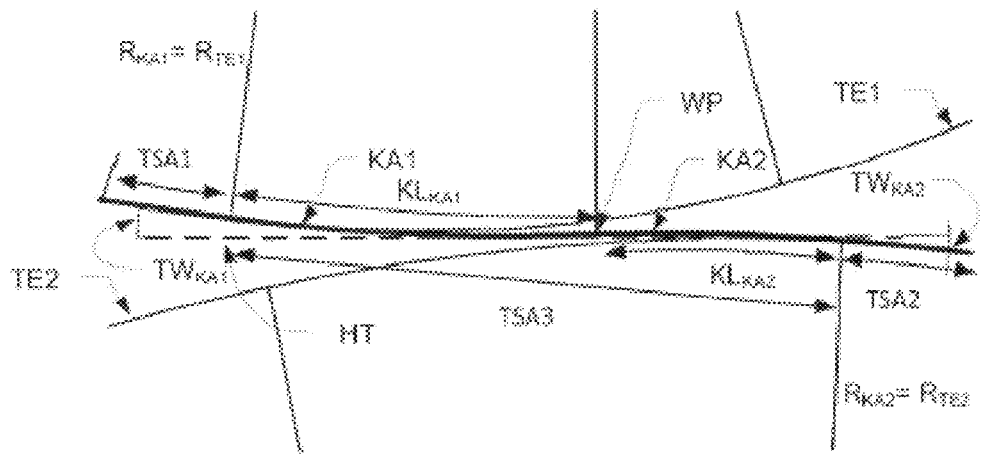
FIG. 2 shows a transport route of a container through a transition region between first and second transport elements of the transport device of FIG. 1.

As shown in FIG. 2, the transport route TS within the transition region include a first transport-route section TSA1, a second transport-route section TSA2, and a third transport-route section TSA3 that lies between the first and second transport-route sections TSA1, TSA2. The first transport-route section TSA1 and the second transport-route section TSA2 are both essentially arcs of a circle. As a result, the transport route's curvature is essentially constant in magnitude along the first and second transport-route sections TSA1, TSA2. The curvatures' directions however, are opposite each other. When observed in the containers' transport direction, the transport-route section TSA1 is left-curved and the second transport-route section TSA2 is right-curved.

The third transport-route section TSA3 comprises first and second clothoid sections KA1, KA2. The use of clothoid sections promotes a jerk-free transfer between the first and second transport elements TE1, TE2.

The first clothoid section KA1 connects directly to the first transport-route section TSA1. It ends, after a clothoid length KLKA1, at a turning point WP at which a curvature change in the transport route TS takes place, for example by changing from left-curvature to right-curvature. The second clothoid section KA2 connects to the first clothoid section at the turning point WP. After a clothoid length KLKA2, the second clothoid section KA2 transitions into the second transport-route section TSA2.

Figure 3:
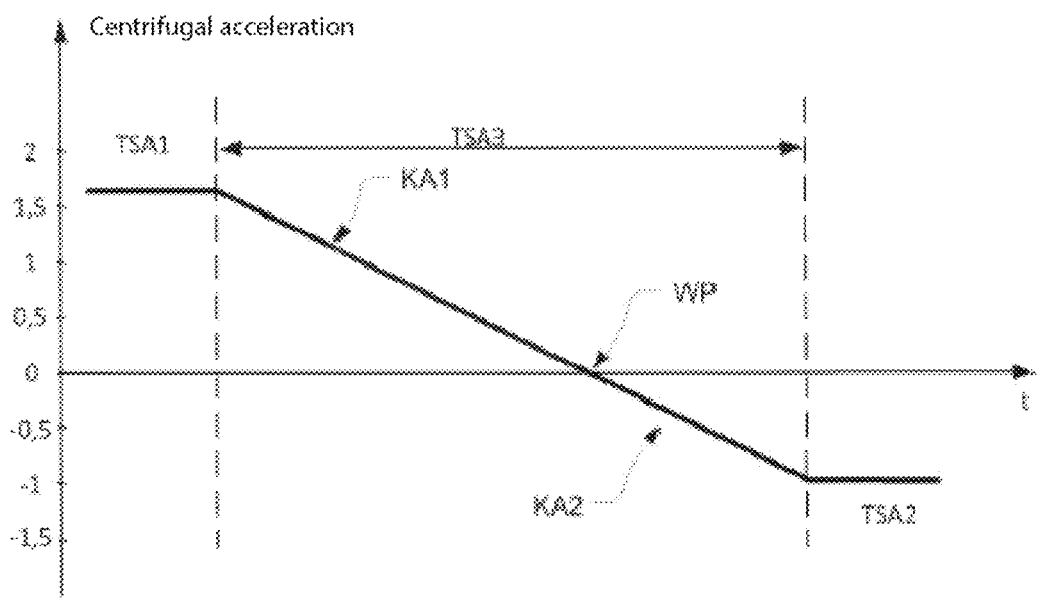
FIG. 3 is a graph of centrifugal acceleration experienced by a container that passes through the transition region between the first and second transport elements.

FIG. 3 shows the centrifugal acceleration experienced by a container 2 as it traverses the section of the transport route TS shown in FIG. 2. As is apparent from the figure, the centrifugal accelerations remain constant along the first and second transport-route sections TSA1, TSA2. However, the signs of the centrifugal accelerations differ and the magnitudes may differ. For example, in FIG. 3, the centrifugal acceleration along the first transport-route section TSA1 exceeds that along the second transport-route section TSA2.

As a result of the manner in which the first and second clothoid sections KA1, KA2 have been configured and dimensioned, centrifugal acceleration along the third transport-route section TSA3 changes linearly or essentially linearly between the value of centrifugal acceleration along the first transport section TSA1 and the value along the second transport section TSA2. This promotes a container's ability to execute a jerk-free transfer from the first transport element TE1 to the second transport element TE2.

Each of the first and second clothoid sections KA1, KA2 is defined by a corresponding radius of curvature RKA1, RKA2, referred to herein as the "clothoid radius." The first and second clothoid sections KA1, KA2 meet at the turning point WP, where they both have an infinite clothoid radius. As a result, the transition between the first and second clothoid sections KA1, KA2 is free of a change in clothoid radius. The clothoids' radii RKA1, RKA2 then transition smoothly into the radii of the corresponding circular arcs RTE1, RTE2 of the first and second transport elements TE1, TE2.

The shape of the third transport-route section TSA3 can therefore be selected according to the particular circumstances, for example so as to correspond to the diameters of the transport elements TE1, TE2. In a first alternative to the configuration shown in FIG. 2, the third transport-route section TSA3 has a single clothoid section. In such an embodiment, a straight transport-section replaces the first clothoid section KA1 shown in FIG. 2. In a second alternative to the configuration shown in FIG. 2, the third transport-route section TSA3 has a straight transport-route region between the first and second clothoid sections KA1, KA2.

A clothoid is a curve along which curvature changes linearly as one proceeds along the curve's length, which is sometimes referred to here in as "clothoid" length, KL. Thus, for a particular clothoid radius R, the product of the clothoid length KL and the clothoid radius R is a constant, which is often referred to as $A^2$, where "A" is referred to as the "clothoid parameter."

Referring to FIG. 2, a useful characteristic value of a clothoid is the tangent angle TW. This is the angle between the tangent line HT at the clothoid's beginning, which is at the turning point WP, and the tangent line along any point on the clothoid. This tangent angle is given by the following equation:

$$TW[\text{rad}] = \frac{KL}{2R} = \frac{A^2}{2R^2}$$

which can also be expressed as, $$A = \sqrt{TW \cdot 2 \cdot R^2}$$

To avoid a transverse jerk at the transition point, it is useful to choose the clothoid radius R at the transition point with the corresponding transport-route section TSA1, TSA2 to satisfy:

$$R = \frac{TK}{2}$$

where TK is the diameter of the transport element TE1, TE2, from which the clothoid section departs or, respectively, connects to that of the clothoid section.

Accordingly, it is preferable for the clothoid radius R of the clothoid section KA1 to be half of the diameter TK of the first transport element TE1, and the clothoid radius R of the clothoid section KA2 to be half of the diameter TK of the second transport element TE2.

It has been discovered that the set of parameters consisting of tangent angle, the clothoid length, and the clothoid parameter, and the range of motion of gripper elements cooperate in a synergistic manner to form a result-effective variable for controlling transverse jerk. This set of parameters, out of all other possible sets, has proven to possess criticality because it is result-effective for minimizing jerk. There has also emerged a particularly useful choice of tangent angle TWKA1, TWKA2 for the tangents at the transitions of the respective clothoid section KA1, KA2 to the circular arc-shaped transport-route section TSA1, TSA2. A choice that possesses criticality is an angle that lies between 0.06 radians and 0.5 radians, and preferably between 0.1 radians and 0.4 radians.

A particularly useful choice of the tangent angle TW is about 0.2 radians. Such an angle has criticality because it results in axial spacing intervals of the transport elements and/or the gripper stroke that can be completed while passing through range of the third transport-route section TSA3 that is small enough to be realizable in practice.

Based on the unexpected multivariate relationship of the five independent parameters that combine synergistically to be a result-effective variable for jerk, a suitable clothoid parameter A is selected preferably in the range between 125 millimeters and 250 millimeters, preferably in the range between 150 millimeters and 200 millimeters, for particular preference in the range between 170 millimeters and 180 millimeters, and in particular 177 millimeters. Additionally, the clothoid length KL lies preferably in the range between 50 millimeters and 250 millimeters, and for particular preference between 100 millimeters and 200 millimeters. The foregoing parameters have been found to unexpectedly achieve a marked reduction in transverse jerk as a container transitions between transport elements. The resulting marked reduction in transverse jerk imparts an element of criticality to the foregoing values.

Referring now to FIG. 4, a transport element 3 includes devices for fixing a container gripper 4 that can be moved radially along the radius of the transport element 3 between a radially inner position and a radially outer position.

A fixed first control curve 35 provides a basis for controlling the gripper's radial position during rotation of the transport element 3. In a preferred embodiment, a roller 36 interacts with the first control curve 35 to radially move the gripper 4 so as to follow the curve shown in FIG. 2 in the region of the third transport-route section TSA3.

In a preferred embodiment, the container gripper 4 moves radially outward for taking the container 2 in the transition region between the first and third transport-route sections TSA1, TSA3. The gripper 4 is drawn radially inward towards the machine axis MA of the second transport element TE2 during movement through the third transport-route section TSA3. The radially inward movement is controlled in such a way as to cause the container 2 to follow the desired course.

Conversely, the gripper moves radially outward while handing over the container to the third transport element TE3. The gripper's movement is again controlled to cause the container 2 to follow a transport course that includes a clothoid transition-curve section.

In some embodiments, after having carried out its handover to the third transport element TE3, the gripper 4 remains in its radially outward position, or is slightly adjusted from it, until it is time to take up another container 2 from the first transport element TE1.

In an alternative embodiment, after having handed over the container 2 at the third transport element TE3, the gripper 4 is drawn radially inward and then extended radially outward shortly before taking a new container 2 from the first transport element TEL FIGS. 4-10 show examples grippers 4 for transporting containers 2, such as bottles, and in particular, PET bottles through a transport device 1 having a transition region having clothoid sections.

Referring to FIG. 4, each transport device 1 includes a transport element 3, such as a rotor, that rotates about a vertical machine axis MA. The transport element's circumference includes pocket-shaped receivers 3.1. These are preferably distributed uniformly along the rotor's circumference. Each such receiver 3.1 accommodates a container gripper 4. In the illustrated embodiment, a receiver 3.1 accommodates the gripper 4 so as to move or otherwise guide the gripper's motion radially towards or away from the machine axis MA. In the illustrated embodiments, the container gripper 4 suspends a container 2 from a neck ring thereof or from a flange provided at the container neck beneath the container's opening, as shown in FIG. 7.

FIG. 4 shows a gripper's carrier body 8. The carrier body 8 includes a slide section 8.1 that defines a groove. The corresponding receiver 3.1 includes a pair of tongues that engage this groove, thus forming a tongue-and-groove connection with the slide section 8.1. This tongue-and-groove connection guides the gripper's radial motion. Once inserted into its corresponding receiver 3.1, the gripper 4 is free to move radially along the double arrow 200 both towards and away from the inserted state of the machine axis MA.

Figure 7:
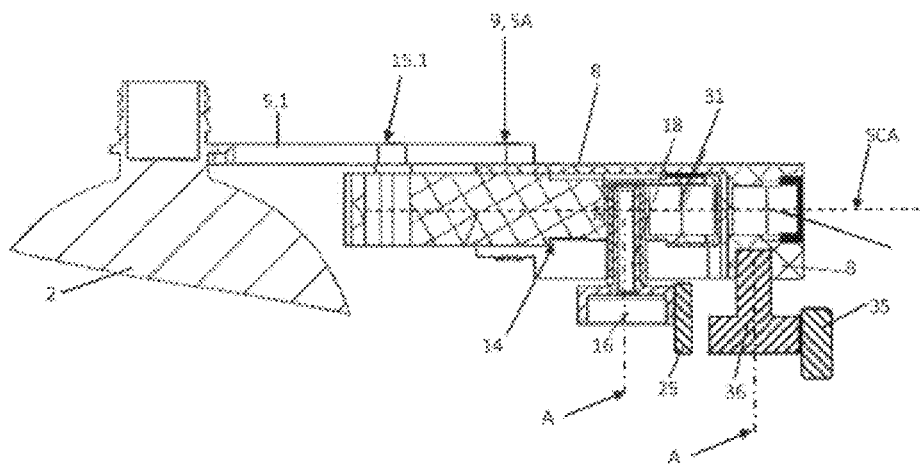
FIG. 7 is a sectional side view of a container gripper along a mid plane.

As shown in FIGS. 4 and 7, the carrier body 8 engages a control roller 36 that rotates freely rotatable about an axis A that is parallel or essentially parallel to the machine axis MA, as shown in FIG. 7. The control roller 36 rolls on the first control curve 35 and thus communicates the shape of the first control curve 35 to the gripper 4. This causes controlled movement of the gripper 4.

In some embodiments, a tension spring draws the carrier body 8 radially relative to the machine axis MA as a result of a displacement by the first control curve 35 outwards.

In an alternative embodiment, the control roller 36 is implemented as a sliding bock that moves in a circumferential direction DA along the first control curve 35 while being guided so as to move radially towards or away from the machine axis MA as a result of mechanical force arising from its interaction with the first control curve 35.

Figure 5:
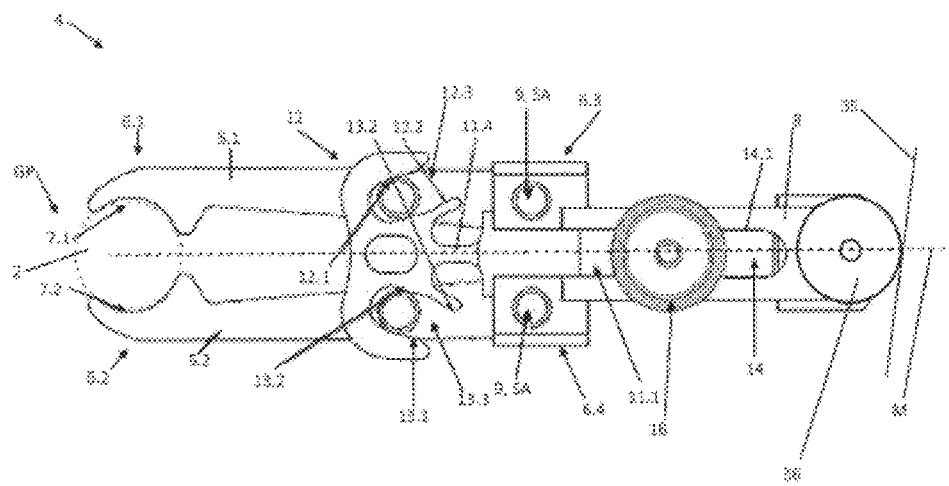
FIG. 5 is a view from below a container gripper that is in a gripping position.

FIG. 5 shows a container gripper 4 in a gripping position GP for gripping a container 2. The gripper 4 includes the carrier body 8, a first gripper arm 5.1 and a second gripper arm 5.2. Each gripper arm 5.1, 5.2 pivots about a pivot axis SA that is parallel to the machine axis MA. When the pivot arms 5.1, 5.2 pivot about their respective pivot axes SA, the gripper 4 transitions between the gripping position GP shown in FIG. 5 and a release position FP shown in FIG. 6.

In some embodiments, the first and second gripper arms 5.1, 5.2 are double lever or double limb arms with outer gripper-arm sections 6.1, 6.2 located radially outwards and with inner grippe-arm sections 6.3, 6.4 located radially inwards. In particular, the first gripper arm 5.1 comprises the outer gripper-arm section 6.1 as well as the inner-gripper arm section 6.3. The second gripper-arm 5.2 comprises the outer gripper-arm section 6.2 as well as the inner gripper-arm section 6.4.

The inner gripper-arm sections 6.3, 6.4 are arranged at the carrier body 8 and mounted with a jointed bolt 9 so as to be capable of pivoting about the pivot axis SA for a mutually opposed pivoting of the gripper arm sections 6.1, 6.2. When gripper arm sections 6.1 pivot away from each, the gripper 4 assumes its releasing position FP. When they pivot towards each other, the gripper 4 assumes its gripping position GP.

The outer gripper arm sections 6.1, 6.2 each form corresponding first and second receivers 7.1, 7.2 that cooperate with each other to form one container receiver when the gripper 4 is in its gripping position GP. As a result, the gripper 4 clamps the container 2 around its neck in such a way that the extent of the clamped portion of the neck is greater than ninety degrees.

Like the jointed bolts 9, the first and second gripper arms 5.1, 5.2 of each container gripper 4 also lie opposite one another in the direction of rotation A of the transport element 3. In the illustrated embodiment, the first and second gripper arms 5.1, 5.2 are arranged to pivot on an upper side of the carrier body 8.

The container grippers 4 are above the carrier body 8 at the transport element 3. In particular, the container grippers 4 are inserted into the pocket-shaped receivers 3.1 of the transport element 3. This insertion can be achieved, for example, by inserting the carrier body 8 into an associated receiver 3.1 so that a positive fit results between the container gripper 4 and the transport element 3.

In some embodiments, the first and second gripper arms 5.1, 5.2 are plastic. In others, the first and second gripper arms 5.1, 5.2 are metal. In either case, the first and second gripper arms 5.1, 5.2 are mirror images of each other. When the gripper arms 5.1, 5.2 are turned about their longitudinal extensions, they are arranged at the carrier body 8 in such a way that the first and second gripper arms 5.1, 5.2 of each container gripper 4 have mirror symmetry about a mid-plane M, shown in FIGS. 5 and 6, that is oriented radially to the machine axis MA and that intersects the machine axis MA.

In addition, the ends of the first and second gripper arms 5.1, 5.2 project radially away from the machine axis MA. As a result, the outer gripper arm section 6.1, 6.2 extends in front of and over the carrier body 8 as well as over the circumference of the transport element 3, as shown in FIG. 4.

In some embodiments, the jointed bolts 9 are secured in the region of the corresponding inner gripper arm section 6.3, 6.4 at the first and second gripper arm 5.1, 5.2. The jointed bolts 9 can be secured in a variety of ways, for example by being adhesively bonded, by being welded on, or by being soldered on.

In other embodiments, the jointed bolts 9 are configured as having been manufactured in one piece with the first and second gripper arms 5.1, 5.2.

In some embodiments, the jointed bolts 9 are secured by locking engagement with the carrier body 8. In these embodiments, the carrier body 8 has an opening that enters into locking engagement with a free end of a corresponding jointed bolt 9 by locking engagement but in a way that preserves the arm's ability to pivot.

A thrust element 11, which can be seen in FIG. 5, provides a way to initiate a force guided pivot movement of the first and second gripper arms 5.1, 5.2 of a corresponding container gripper 4. The thrust element 11 is radially movable towards and away from the machine axis MA.

The thrust element 11 includes a guide section 11.1, a control section 11.2, and a connection section 11.4 between the guide section 11.1 and the control section 11.2. The first and second control curves 12, 13 couple to the control section 11.2. In some embodiments, the thrust element 11 is configured as a single piece.

The configuration features a constricted region that weakens a region of the connection section 11.4. This permits the control section 11.2 to engage in elastic deflection in the circumferential direction either in the direction of rotation DA or opposite that direction.

The control section 11.2 is essentially W-shaped so that it has two outer limbs and an inner limb. The "W" has two recesses formed by the three limbs. First and second control curves 12, 13 are formed on the outer limbs of the "W."

Figure 6:
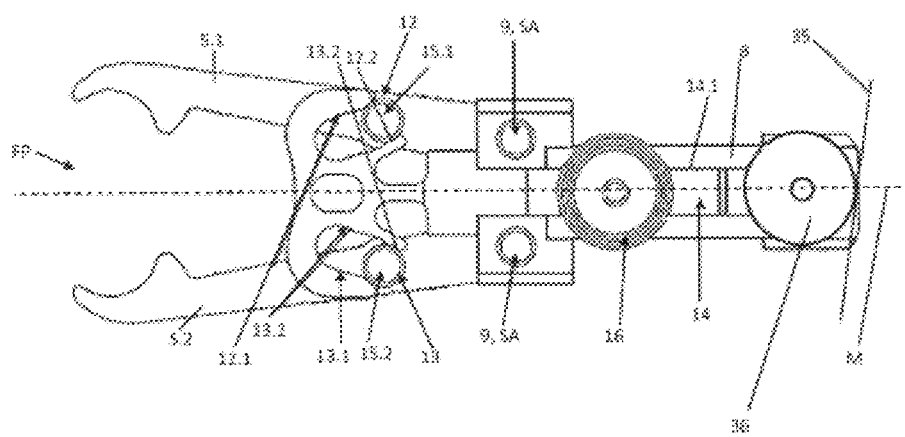
FIG. 6 shows a view from below a container gripper that is in the releasing position.

As shown in FIG. 6, the control section's first control curve 12 controls movement of the first gripper arm 5.1 and the control section's second control curve 13 controls movement of the second gripper arm 5.2. On its side facing the carrier body 8, the first gripper arm 5.1 includes a first engagement element 15.1 that engages the first control curve 12. The second gripper arm 5.2 comprises a second engagement element 15.2 that engages the second control curve 13. As a result, the thrust element 11, using its first and second control curves 12, 13 guides the respective gripper arms 5.1, 5.2 during movement between the gripping position GP and the releasing positions FP.

In some embodiments, the engagement element 15.1, 15.2 is a bolt that is oriented so that its axis extends parallel or approximately parallel to the pivot axis SA or machine axis MA. In preferred embodiments, the engagement element 15.1, 15.2 is manufactured as one piece with the corresponding gripper arm 5.1, 5.2.

The first control curve 12 comprises first and second guide surfaces 12.1, 12.2 located opposite one another and running parallel to the pivot axis SA of the first gripper arm 5.1. The first engagement element 15.1 is guided by being between the gripping and releasing positions GP, FP by being in contact with first and second guide surfaces 12.1, 12.2 of the first control curve 12. This contact results in forced guidance of the first gripper arm 5.1. The first control curve 12 extends in a direction that forms an acute angle relative to the mid-plane M. This leads to a desirable self-locking effect.

In an analogous manner, the second control curve 13 comprises first and second guide surfaces 13.1, 13.2 located opposite one another and running parallel to the pivot axis SA of the second gripper arm 5.2. These first and second guide surfaces 13.1, 13.2 contact the second engagement element 15.2 and guide it as the gripper 4 transitions between its gripping and releasing positions GP, FP. Accordingly, the forced guidance for the second gripper arm 5.2 is implemented in particular by the contact, i.e. contact-fit, guidance of the second engagement element 15.2 in the second control curve 13, at its first and second guide surfaces 13.1, 13.2. The second curve 13 likewise extends along a longitudinal direction that forms an acute angle relative to the mid-plane M.

In a preferred embodiment, the first and second control curves 12, 13 have mirror-symmetry about the mid-plane and oriented radially to the machine axis MA such that two lines extended from the control curves 12, 13 would enclose the machine axis MA.

The first and second control curves 12, 13 are configured in such a way that radial displacement of the thrust element 11 causes their respective first guide surfaces 12.1, 13.1 to begin closing the gripper 4 as the gripper 4 transitions into the gripping position GP. Similarly, radial displacement of the thrust element 11 causes the second guide surfaces 12.2, 13.2 to begin opening the gripper 4 as it transitions into the releasing position FP with a radial displacement of the thrust element 11.

The first guide surface 12.1 is flatter relative to the radius in order to attain the self-locking effect. Meanwhile, the second guide surface 12.2 is somewhat steeper. This permits a wider opening with a small stroke.

In a preferred embodiment, the first guide surfaces 12.1, 13.1 of the two control curves 12, 13 have mirror-symmetry about the mid-plane M and the second guide surfaces 12.2, 13.2 of the control curves 12, 13 have mirror-symmetry about the mid-plane M.

In some embodiments, the first and second control curves 12, 13 open towards the machine axis MA. The first and second control curves 12, 13 also include corresponding insertion openings 12.3, 13.3. During installation, one passes the engagement elements 15.1, 15.2 through these insertion openings 12.3, 13.3 to couple them to the relevant control curve 12, 13.

Some embodiments have tapered insertion openings 12.3, 13.3. Such a taper increases the force that is needed to push the thrust element 11 over the engagement elements 15.1, 15.2 into the control curve 12, 13. The resulting taper thus serves as a retainer when the gripper 4 is in its open position.

In the embodiment shown in FIG. 7, a cutout aperture 14 in the carrier body 8 forms a hollow cylinder that accommodates the thrust element's guide section 11.1. This permits the thrust element 11 to be guided during movement in the radial direction towards or away from the machine axis MA.

The cutout aperture 14 lies along a thrust axis SCA that is perpendicular to the machine axis MA. While accommodated in the cutout aperture 14, the guide section 11.1 moves along the thrust axis SCA when it is accommodated in the cutout aperture 14. In some embodiments, the guide section 11.1 is a cylindrical thrust bolt. The aperture 14 accommodates the thrust bolt and guides its movement along the thrust axis SCA.

As shown in FIGS. 5 and 6, there exists a slot-shaped opening 14.1 in the cutout aperture 14 in the carrier body 8. The slot-shaped opening 14.1 extends along the mid-plane M and is therefore parallel to the thrust axis SCA.

In a preferred embodiment, the slot-shaped opening 14.1 is dimensioned in such a way that at least 120° of the guide section's circumference remains supported. This tends to secure the guide section 11.1 from falling out of the cutout aperture through the slot-shaped opening 14.1. It is usually sufficient to support each side of the guide section 11.1 by between sixty and ninety degrees, thus providing a total support of 120° to 180°.

The cutout aperture 14 therefore forms, in the region of its slot-shaped opening 14.1, lateral cheeks for radially guiding the curve roller 16. It also supports the lateral forces incurred by the control curves 12, 13, during the pivot movement and therefore secures the thrust element 11 against a rotation about the thrust axis SCA.

The cutout aperture 14, and the slot-shaped opening 14.1 are long enough to allow the thrust element 11 to move radially towards or away from the machine axis MA by a movement stroke that is enough to switch the thrust element 11 between the releasing and the gripping positions FP, GP.

At one end of the carrier body 8, namely the end that faces away from the machine axis MA, the carrier body 8 guides the thrust element 11 as the thrust element 11 moves radially so as to project out of the cutout aperture 14. Controlled pushing of the thrust element 11 causes a radially outward translation thereof that, in turn, causes the gripper arms 5.1, 5.2 to begin pivoting.

A variety of ways exist for causing this radial translation of the thrust element 11. Among these are the use of a curve roller 16, which can be seen in FIG. 5. The curve roller 16 is freely rotatable at the guide section 11.1. The curve roller 16 rotates around an axis A, best seen in FIG. 7. The axis A is parallel to or essentially parallel to the machine axis MA.

In some embodiments, the curve roller 16 is under the thrust element 11. Among these are embodiments in which the curve roller 16 is on the underside of the guide section 11.1 of the thrust element 11 and projects past the underside through the slot-shaped opening 14.1 in the carrier body 8.

The transport device 1 has a device frame on which a control curve is formed. This control curve, which is omitted for clarity, controls all the grippers 4 of the transport device 1. The curve roller 16 interacts with this control curve to control the radial translation of the thrust element 11 and hence the state of the gripper 4 of which it is a part.

FIGS. 4 and 5 show the container gripper 4 in its gripping position GP with the thrust element 11 having been moved radially inwards, symbolized by the double arrow 100 in FIG. 4.

As can be in FIG. 7, there exists a second control curve 25 that engages the roller 16. The first control curve 35 radially moves the entire container gripper 4 using the control roller 36, which rolls at the first control curve 35. This motion can be seen as the double arrow 200 in FIG. 4. In addition, second control curve 25 interacts with the curve roller 16 to radially move the thrust element 11, as symbolized by the double arrow 100 in FIG. 4.

The curve roller 16 moves radially outwards to move the container gripper 4 into its releasing position FP. When it does so, the guide surface 12.2, 13.2 of the thrust element's two control curves 12, 13 pivot the two gripper arms 5.1, 5.2 into the releasing position FP.

In some embodiments, a magnetic force assists in resetting the gripper arms 5.1, 5.2 back into the gripping position GP and provides force for gripping a container 2. In some of these embodiments, the magnetic force operates by moving the thrust element 11 radially inward along the thrust axis SCA.

Among these is an embodiment in which the thrust element 11 and the carrier body 8 comprise corresponding first and second magnets 31, 30. However, an alternative embodiment, a ferromagnetic element replaces one of the magnets.

Preferably, the first magnet 31 is securely arranged at a free end of the guide section 11.1 facing the machine axis MA and the second magnet 30 is along the thrust axis SCA.

In a preferred embodiment, the first and second magnets 30, 31 are provided along the thrust axis SCA in such a way that, in the gripping position GP, the second magnet 31 contacts the first magnetically-responsive element 30, whereas in the release position FP, the first and second magnets 30, 31 are at a distance from each other but still subject to magnetic attraction.

Figure 8:
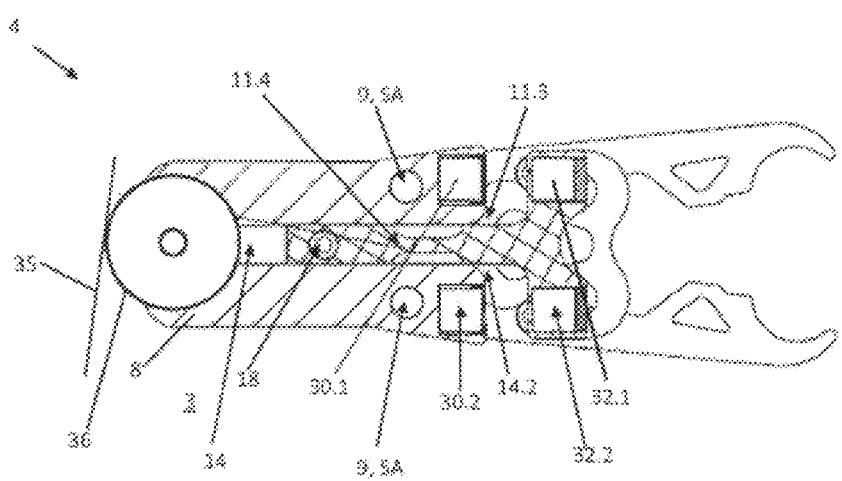
FIG. 8 is a top view of another embodiment of a container gripper.

In the embodiment show in FIG. 8, the guide section 11.1 secures the thrust element 11 so that it does not fall through the cut out aperture 14. In such an embodiment, the slot-shaped cutout aperture 14 forms a guide rail or guide groove. The guide section 11.1 functions as a tongue that forms a tongue-and-groove joint. This joint permits both holding and guiding of the thrust element 11.

The slot-shaped aperture 14 extends along the mid-plane M. Its length allows for the thrust element 11 to move radially far enough to accommodate the stroke that the thrust element 11 carries out between the releasing and the gripping position FP, GP. In some embodiments, the slot-shaped aperture 14 comprises a closed end 14.1 that faces the machine axis MA and an open end 14.2 that faces away from the closed end 14.1

The thrust element's controlled radial translation pivots the gripper arms 5.1, 5.2. As a curve roller 16 in the guide section 11.1 follows a control curve, it communicates the control curve's shape to the thrust element 11. The curve roller 16 rotates about an axis A that is parallel or essentially parallel to the machine axis MA. In a preferred embodiment, the rotatable curve roller 16 is on the under side of the thrust element 11.

In the embodiment shown in FIG. 5, a magnetic force moves the gripper arms 5.1, 5.2 between the releasing position FP and the gripping position GP. In this embodiment, a magnetic force on the thrust element 11 is perpendicular or essentially perpendicular to the machine axis MA.

In contrast with the embodiments shown in FIGS. 4 and 5, FIG. 7 shows an embodiment in which the carrier body's magnets 30.1, 30.2 are in the region of the open end 14.2 of the slot-shaped opening 14. In particular, the two magnets 30.1, 30.2 are fixed on both sides at the free face sides of the carrier body 8 formed by the open end 14.2.

FIG. 8 shows an embodiment in which the thrust element 11 comprises first and second magnets 32.1, 32.2 that form an opposite pole for the carrier body's magnets 30.1, 30.2. These magnets interact magnetically in the manner described in greater detail in connection with FIGS. 4 and 5.

The thrust element 11 comprises a holding section 11.3 that is formed as one piece with the thrust element 11 and that can be arranged underneath the control section 11.2 at the thrust element 11. The holding section 11.3 includes at least two holding surfaces 32.1, 32.2 that face the open end 14.2. Two magnets 31.1, 31.2 are securely arranged in the corresponding two holding surfaces 32.1, 32.2.

The magnets 31.1, 31.2 and the magnets 30.1, 30.2 lie in a common plane that is oriented parallel or essentially parallel to a plane spanned by the control curves 12, 13. In a preferred embodiment, the magnets are arranged beneath the plane spanned by the control curves 12, 13.

In some embodiments, a magnetic force holds the curve roller 16 at the thrust element 11. The roller 16 freely rotates about the axis A, which is parallel or essentially parallel to the machine axis MA or perpendicular or essentially perpendicular to the thrust axis SCA.

Figure 9:
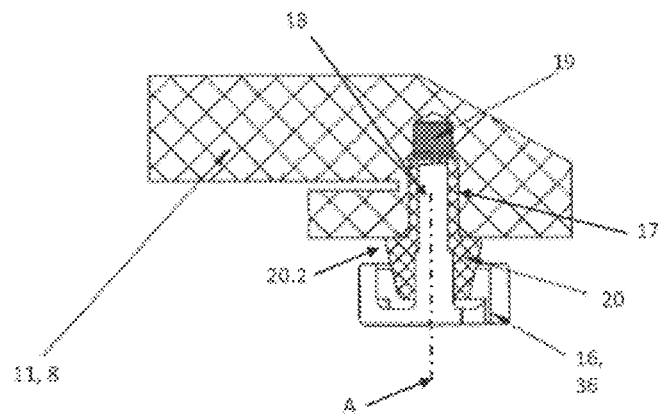
FIG. 9 is a side sectional view of an arrangement of a curve roller at a thrust element.
Figure 10:
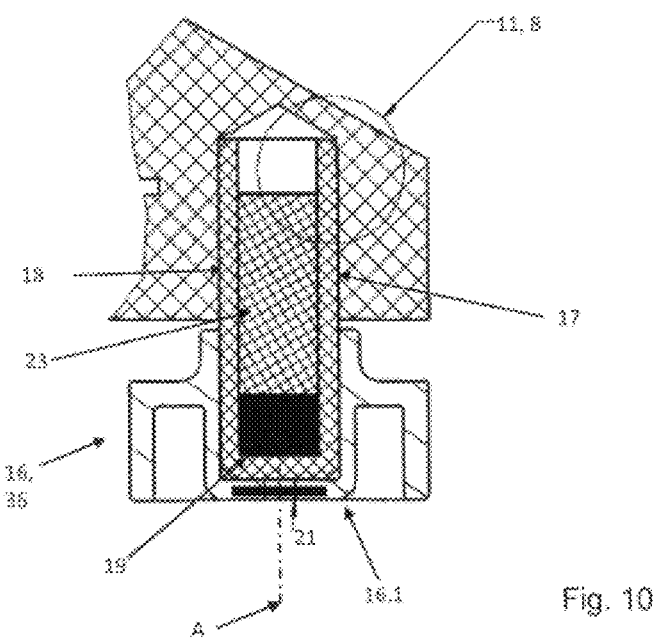
FIG. 10 is a sectional side view of an alternative arrangement of a curve roller at a thrust element.

Referring now to FIG. 9, the thrust element 11, in particular the guide section 11.1, includes a magnetic bearing section 17. In the illustrated embodiments, the bearing section 17 is a rotationally symmetrical cutout aperture or opening such as a cylindrical blind hole. A bearing bolt 18 secures the curve roller 16 while allowing it to also rotate.

In some embodiments, a single piece includes both the curve roller 16 and the bearing bolt 18. Among these are embodiments in which either or both the curve roller 16 and the bearing bolt 18 include ferromagnetic material.

In some embodiments, either the curve roller 16 and/or the bearing bolt 18 interact with the magnet 31 in such a way that the curve roller 16, including the bearing bolt 18, are secured against unintentionally falling out of the bearing section 17. In other words, the curve roller 16 and/or the bearing bolt 18 form the opposite pole to the magnets 31. Mutatis mutandis, the foregoing also applies to the magnetic holding of the curve roller 16 to the thrust element 11 in an analogous manner with regard to the magnetic holding of the control roller 36 to the carrier body 8.

In the foregoing embodiments, the transition curve has been described as a clothoid or a section of a clothoid. As an alternative, it is also possible to provide here for another suitable transition curve with a kink-free constantly increasing or decreasing curvature change. An example of such a curve is a bloss curve or bloss curve section. Embodiments also include those in which the transition curve is a combination of a bloss curve and a clothoid.

FIG. 11 shows a section of the transport route TS from FIG. 1 in the region of the oval represented by the broken line. This section defines a transition region between the first and second transport element TE1, TE2. A container being conveyed from the first transport element TE1 to the second transport element TE2 runs through the third transport-route section TSA3. This section comprises a first bloss curve section BA1 and a second bloss curve section BA2. These are shaped to permit essentially jerk-free transfer of a container. In particular, the curvature k of the bloss curve sections BA1, BA2 is described by the following formula:

$$k = \frac{3}{R \cdot L^2} \cdot l^2 - \frac{2}{R \cdot L^3} \cdot l^3$$

where R is a radius of a connection circular arc, i.e. for example the radius RTE1, RTE2 of the respective transport elements TE1, TE2 for which the bloss curve section forms the transition, I is an intermediate length of a transition-curve section as seen from a transition-curve's start point UA, which is also designated as the turning point WP of the third transport-route section TSA3. The variables I1, I2 represent intermediate lengths of the respective bloss curve sections BA1, BA2). The variable L forms the total length of the transition curve or the bloss curve section. In the exemplary embodiment, the lengths L1, L2 are the lengths of the respective bloss curve sections BA1, BA2.

The invention has been described heretofore on the basis of exemplary embodiments. It is understood that a large number of alternatives or derivatives are possible without thereby departing from the scope of protection of the invention as defined by the claims.

Having described the invention and a preferred embodiment thereof, what is claimed as new and secured by letters patent is:

1. An apparatus for transporting containers along a transport route, said apparatus comprising first and second transport elements, at least one of which comprises grippers that are movable radially in relation to a vertical machine axis about which said first transport element rotates, wherein each gripper is configured to be drawn radially inward along a radius and extended radially outward along a radius of one of said first and second transport elements between a radially inner position and a radially outer position, wherein said first and second transport elements define a transport route that comprises first and second transport-route sections defined by circular arcs and a third transport-route section disposed between said first and second transport-route sections, and wherein said third transport-route section comprises a transport-route region that defines a course having a transition-curve section that is kink free and having a curvature that either only increases or only decreases.

2. The apparatus of claim 1, wherein said third transport-route section comprises first and second transition-curve sections.

3. The apparatus of claim 2, wherein said first and second transition-curve sections connect to each other at a turning point.

4. The apparatus of claim 2, wherein a transport-section region that runs in a straight line connects said first and second transition-curve sections.

5. The apparatus of claim 1, wherein said third transport-route section comprises a region that runs in a straight line and a region that runs along a transition curve section.

6. The apparatus of claim 1, wherein at least one of said transport-route sections runs between envelope curves that define a corridor that has a width of between four millimeters and ten millimeters.

7. The apparatus of claim 1, wherein at least one of said transport-route sections runs between envelope curves that define a corridor having a width of between two millimeters and five millimeters.

8. The apparatus of claim 1, wherein said transition-curve section includes a clothoid section.

9. The apparatus of claim 1, wherein said transition-curve section includes a bloss curve section.

10. The apparatus of claim 8, wherein said clothoid section is characterized by a clothoid parameter, a tangent angle, and a clothoid length, wherein said clothoid parameter, when squared and then divided by said clothoid radius, equals said clothoid length, and wherein the square root of twice the product of said tangent angle and the square of said clothoid radius is equal to said clothoid parameter.

11. The apparatus of claim 10, wherein said clothoid parameter is selected to be between 125 millimeters and 250 millimeters.

12. The apparatus of claim 10, wherein said clothoid parameter is selected to be between 170 millimeters and 180 millimeters.

13. The apparatus of claim 10, wherein said tangent angle is selected to be between 0.06 radians and 0.5 radians.

14. The apparatus of claim 11, wherein said tangent angle is selected to be between 0.1 radians and 0.4 radians.

15. The apparatus of claim 12, wherein said tangent angle is selected to be 0.2 radians.

16. The apparatus of claim 9, wherein said bloss curve section is defined by a curvature k and a radius of a connection circular arc R, wherein I is an intermediate length of said transition curve section as seen from a starting point, wherein said transition curve has a total length L, and wherein a curvature of said bloss curve section is described by $$k = \frac{3}{R \cdot L^2} \cdot l^2 - \frac{2}{R \cdot L^3} \cdot l^3$$

17. The apparatus of claim 10, wherein said clothoid length is between 50 millimeters and 250 millimeters.

18. The apparatus of claim 1, further comprising a control curve configured for guiding radial movement of said grippers.

19. The apparatus of claim 1, wherein said first and second transport elements are driven such as to rotate about vertical machine axes thereof.

20. A method comprising transporting a container along a transport route that comprises first, second, and third transport-route sections, said first and second transport route sections being defined by corresponding circular arcs and said third transport-route section being disposed between said first and second transport-route sections, wherein transporting said container comprises using first and second transport elements to convey said container along said transport route, a particular transport element being selected from the group consisting of said first and second transport elements, conveying said container along said third transport-route section in sections along a course that comprises a kink-free transition curve section with a curvature that either only decreases or only increases, wherein, while conveying said container, using a gripper at said particular transport element to hold said container, causing said gripper to convey said container along said transition curve section as said third transport element rotates about a vertical machine axis thereof, and while said gripper is conveying said container, causing said gripper to move radially relative to said vertical machine axis, wherein causing said gripper to move radially comprises causing said gripper to move along a radius between a radially inner position and a radially outer position, wherein said radius is that of one of said first and second transport elements, and wherein causing said gripper to move along said radius comprises one of drawing said gripper radially inward towards said radially inner position and extending said gripper radially outward towards said radially outer position.

* * * * *